United States Patent [19]
Bertin et al.

[11] Patent Number: 5,940,372
[45] Date of Patent: Aug. 17, 1999

[54] METHOD AND SYSTEM FOR SELECTING PATH ACCORDING TO RESERVED AND NOT RESERVED CONNECTIONS IN A HIGH SPEED PACKET SWITCHING NETWORK

[75] Inventors: Olivier Bertin; Eric Levy-Abegnoli, both of Nice, France

[73] Assignee: International Business Machines Corporation, Armonk, N.Y.

[21] Appl. No.: 08/678,939

[22] Filed: Jul. 12, 1996

[30] Foreign Application Priority Data

Jul. 13, 1995 [EP] European Pat. Off. ............... 95480085

[51] Int. Cl.[6] .................................................. H04L 12/56
[52] U.S. Cl. ............................................ 370/238; 370/400
[58] Field of Search ................................... 370/235, 238, 370/254, 255, 351, 389, 392, 256, 400, 428, 237, 253; 395/200.68, 200.69, 200.71

[56] References Cited

U.S. PATENT DOCUMENTS

| | | | |
|---|---|---|---|
| 5,031,093 | 7/1991 | Hasegawa | 370/400 |
| 5,067,127 | 11/1991 | Ochiai | 370/238 |
| 5,233,604 | 8/1993 | Ahmadi et al. | 370/400 |
| 5,253,248 | 10/1993 | Dravida et al. | 370/408 |
| 5,347,511 | 9/1994 | Gun | 370/400 |
| 5,381,404 | 1/1995 | Sugano et al. | 370/238 |
| 5,600,638 | 2/1997 | Bertin et al. | 370/400 |

*Primary Examiner*—Chau Nguyen
*Attorney, Agent, or Firm*—Gerald R. Woods

[57] ABSTRACT

The present invention is related to high speed packet switching networks and, more particularly, to a process for selecting an optimal path for packets transmission without bandwidth reservation in communication systems supporting both bandwidth-reserved and non-bandwidth-reserved connections. Non-reserved network connections do not have bandwidth set aside either implicitly or explicitly. The lowest delay priority is assigned to non-reserved traffic and the networks drops non-reserved packets when their buffer overflow at intermediate links. Because the data profile over the connections is bursty and non deterministic, reserved traffic does not lead to a full links utilization except on peaks. Therefore, non-reserved traffic can be transmitted when some bandwidth is available on the links. The purpose of an efficient bandwidth management is to reserve on the links as many bandwidth as possible with a guaranteed quality of service, and to use the inherent remaining bandwidth to transport traffic from the users who are just expecting a "best effort" service. The Path Selection algorithm for non-reserved connections comprises the step of weighing each transmission link with a weighing function dependent of both reserved non-reserved traffic.

7 Claims, 10 Drawing Sheets

| CHARACTERISTIC | | LINK VALUES | | | |
|---|---|---|---|---|---|
| NAME | DESCRIPTION | A | B | ... | N |
| C | TOTAL CAPACITY (BPS) | $C_A$ | $C_B$ | ... | $C_N$ |
| RF | RESERVABLE FRACTION (%) | $RF_A$ | $RF_B$ | ... | $RF_N$ |
| $\widehat{C}_R$ | TOTAL RESERVED BANDWIDTH (BPS) | $\widehat{C}_{R,A}$ | $\widehat{C}_{R,B}$ | ... | $\widehat{C}_{R,N}$ |
| $M_{NR}$ | TOTAL BANDWIDTH USED BY NR TRAFFIC (BPS) | $M_{NR,A}$ | $M_{NR,B}$ | ... | $M_{NR,N}$ |
| MPS | MAXIMUM PACKET SIZE (BYTES) | $MPS_A$ | $MPS_B$ | ... | $MPS_N$ |

FIG. 4

METHOD AND SYSTEM FOR SELECTING PATH ACCORDING TO RESERVED AND NOT RESERVED CONNECTIONS IN A HIGH SPEED PACKET SWITCHING NETWORK

TECHNICAL FIELD

The present invention is related to a process for selecting a routing path in a high speed packet switching network and more particularly for routing non-reserved bandwidth traffic according to both reserved and non-reserved bandwidth on connections.

BACKGROUND ART

The evolution of the telecommunications in general and of the packet switching networks in particular is driven by many factors among which two of them worth emphasizing: technologies and applications.
Emerging Technologies
 Communication technologies have realized these last years considerable progress with:
  the maturing of new transmission media and specially of optical fiber. High speed rates can now be sustained with very low bit error rates. For example, the very important bandwidth provided by optical connections, their low attenuation and their high transmission quality are turned to account as well as for long distance networks as for high rate local networks.
  the universal use of digital technologies within private and public telecommunications networks.
New Applications
 On the other hand, in relation with these new emerging technologies, many potential applications that where not possible before are now becoming accessible and attractive. In this environment, three generic requirements are expressed by the users:
  Improving Old Applications
   Sub-second response times, which are achievable on low cost personal computers, have raised user expectations so that the lengthy wide area networks response times that were acceptable some years ago are today no longer tolerable. The user interface can be bettered, for example, with fast response full screen applications.
  Optimizing Communication Networks
   There is a need for rationalizing the many disparate networks that major users have. Investments can be optimized by integrating heterogeneous traffics like voice, video, and data over the same transport facilities regardless of protocols. Users want the opportunity to control their networking cost by choosing among the different price/performance options offered by the variety of vendors and carriers and to maximize their ability to take advantage of applications built on top of disparate underlying network technologies. However, the motivation for rationalization this is not only to save money on links but also to provide a better networking service by integrating the many disparate networks into a single coherently managed unit.
  Doing New Applications
   Emerging applications like graphic, image, video, and multimedia processing are requiring a very large volume of traffic. These new applications that were not feasible (or indeed imaginable) before are now becoming accessible generating an ever-increasing demand on bandwidth.

High Speed Packet Switching Networks
 Data transmission is now evolving with a specific focus on applications and by integrating a fundamental shift in the customer traffic profile. Driven by the growth of workstations, the local area networks interconnection, the distributed processing between workstations and super computers, the new applications and the integration of various and often conflicting structures—hierarchical versus peer to peer, wide versus local area networks, voice versus data—the data profile has become more bandwidth consuming, bursting, non-deterministic and requires more connectivity. Based on the above, there is strong requirement for supporting distributed computing applications across high speed networks that can carry local area network communications, voice, video, and traffic among channel attached hosts, business, engineering workstations, terminals, and small to intermediate file servers. This vision of a high speed multiprotocol network is the driver for the emergence of fast packet switching networks architectures in which data, voice, and video information is digitally encoded, chopped into small packets and transmitted through a common set of nodes and links.

An efficient transport of mixed traffic streams on very high speed lines means for these new network architecture a set of requirements in term of performance and resource consumption which can be summarized as follows:
 a very large flexibility to support a wide range of connectivity options,
 a very high throughput and a very short packet processing time,
 a efficient flow and congestion control.
Connectivity
 In high speed networks, the nodes must provide a total connectivity. This includes attachment of the user's devices, regardless of vendor or protocol, and the ability to have the end user communicate with any other device. The network must support any type of traffic including data, voice, video, fax, graphic or image. Nodes must be able to take advantage of all common carrier facilities and to be adaptable to a plurality of protocols. All needed conversions must be automatic and transparent to the end user.
Throughput and Processing Time
 One of the key requirement of high speed packet switching networks is to reduce the end-to-end delay in order to satisfy real time delivery constraints and to achieve the necessary high nodal throughput for the transport of voice and video. Increases in link speeds have not been matched by proportionate increases in the processing speeds of communication nodes and the fundamental challenge for high speed networks is to minimize the packet processing time within each node. In order to minimize the processing time and to take full advantage of the high speed/low error rate technologies, most of the transport and control functions provided by the new high bandwidth network architectures are performed on an end-to-end basis. The flow control and particularly the path selection and bandwidth management processes are managed by the access points of the network which reduces both the awareness and the function of the intermediate nodes.
Flow and Congestion Control
 Communication networks have at their disposal limited resources to ensure an efficient packets transmission. These limitations are principally located at the level of links bandwidth, nodes processing capacity and buffers size at the emission and reception of data packets. When the traffic demand increases, the network undergoes congestion phenomenons which take the form of a collapse of the network performances expressed in terms of actual throughput, average transfer delay of packets through the network, number of packets lost or in error . . . .

An ideal network should be able to transmit an useful traffic directly proportional to the traffic offered to the network and this as far as the maximum transmission capacity is reached. Beyond this limit, the network should operate at its maximum capacity whatever the demand is. In the reality, the operations diverge from the ideal for a certain number of reasons which are all related to the inefficient allocation of resources in overloaded environment. In particular, the size of the queues on the links increases rapidly in function of the traffic and exceeds the capacity of the buffers in the nodes. Packets which can not be stored any more are thrown away causing their retransmission and propagating congestion towards links located upstream generating an additional internal traffic. There is an avalanche phenomenon due to the fact that beyond a certain limit, the useful transport capacity of the network decreases when the demand for traffic increases.

For the operating to be satisfactory, the network must be implemented so as to avoid congestion. The simplest solution obviously consists in oversizing the equipments so as to be positioned in an operating zone which is distant from the congestion. This solution is generally not adopted for evident reasons of costs and it is necessary to apply a certain number of preventive measures among which the main ones are:

the flow control for regulating the emitting data rate of the calling subscriber at a rate compatible with what the receiver can absorb.

the load regulation for globally limiting the number of packets present in the network to avoid an overloading of the resources, and the load balancing for fairly distributing the traffic over all the links of the network to avoid a local congestion in particular resources.

Bandwidth Management

An efficient bandwidth management is essential to take full advantage of a high speed network. While transmission costs per byte continue to drop year after year, transmission costs are likely to continue to represent the major expense of operating future telecommunication networks as the demand for bandwidth increases. Thus considerable efforts have been spent on designing flow and congestion control processes, and routing algorithms to better manage the network bandwidth.

Routing Modes

A general problem in the communication networks is to find a path between a source and a destination node. When the network is using datagrams, the path selection must be done individually for each packet. For virtual circuits, the path decision is done once only at the time of the connection (or session) establishment. In both cases, the choice of a routing algorithm is not easy because it must satisfy a large number of often conflicting requirements. This algorithm must be simple to implement for not complicating the nodes realization, it must ensure a correct progress of the packets whatever the disturbance on the network. The algorithm must be able to provide satisfying results despite of the traffic variations and the network topology. It must also ensure the equity between the different end users and provide an equal distribution of the rights to access the network. At last, the routing algorithm must allow, when possible, to exploit the network in an optimal way, according to a criterion which can vary with the utilization type. In most of the cases, the network is realized in a way to minimize the packet transit time and to transfer the maximum number of packets. In other cases, the objective is to decrease the communication cost, or to develop a reliable network able to operate correctly either in case of catastrophic line, node failure or peaks of traffic.

Because of the variety of the constraints, there are a large number of different routing types like Flooding Routing, Random or Stochastic Routing, Deterministic Routing. This last technique is one of the most widely used. Two modes of operation are opposed: the Fixed Routing and the Adaptive Routing.

Fixed Routing

The Fixed Routing defines paths that must take the different packets according to the general network characteristics such as the network topology and the mean traffic expected on the communication lines. The routing rules are established once and aims for optimizing the performance criterion privileged by the user. The Fixed Routing is very simple in its principles and allows to considerably speed up the packet transmission through the network. However, this technique is not very flexible.

Adaptive Routing

Contrary to the Fixed Routing, the purpose of the Adaptive Routing is to satisfy at any time the optimization criterion. Tables are permanently updated according to, for example, the instantaneous state of the traffic on the lines.

Centralized Routing

When the characteristics of the network fluctuate, it is possible to adapt the routing by assigning to one node the responsibility to update periodically the routing tables according to the traffic variations and the topology. This method, simple in its principles, is called Centralized Routing. Its principal disadvantage is to generate an important auxiliary traffic and to subordinate the good functioning of the network to only one node. Furthermore, the Centralized Routing can generate some problems at the time the tables are refreshed because said tables cannot be received at the same time by all the nodes. A solution is to decentralize the tables establishment at the level of each node.

Distributed Routing

The Distributed Routing is a method in which neighboring nodes are exchanging messages concerning the traffic and the network condition to update their own routing tables.

End-to-End Routing

The Distributed Routing is currently used in most high speed networks. Nodes are exchanging control messages to obtain all information required for routing packets. In order to minimize the processing time and to take full advantage of the high speed/low error rate technologies, the transport and control functions provided by the high bandwidth networks are performed on an end-to-end basis. No hop-by-hop error recovery or retransmission is envisioned in high speed, high performance (low error) links, and thus, there is no need for transit nodes to be aware of individual transport connections. The originating node is responsible for calculating the route that a packet must take through the network. The routing of the packets presents two aspects for which a wide range of implementing methods exists:

1. Determining what the route for a given connection shall be,

2. Actually switching the packet within a switching node.

Connection-Oriented and Connectionless Routing

As described in the document High Speed Networking Technology, An Introductory Survey (pages 116 to 129)—

GG24-3816-00 ITSC Raleigh June 1993, one distinguishing characteristic of a network is the presence or absence of a "connection" between end users. They are many ways of constructing connectionless or connection-oriented networks. In most of cases, packets using different routing modes can share the same data transmission facilities. Two routing modes are widely used and are described as example: the Automatic Network Routing and the Label Swapping.

Automatic Network Routing

The Automatic Network Routing is a particular implementation of the Distributed Routing for connectionless networks. The source node (or access node) is responsible for calculating the route the packet must take through the network. Each packet includes in its routing field a list of labels of all links through which the packet will pass as it move across the network. The labels are used by the intermediate nodes to direct the packet towards its destination. Each packet is routed through the network as a self contained unit and is independent of all other packets. Automatic Network Routing requires no connection set up activity in intermediate nodes and support true datagram services.

Label Swapping

The Label Swapping is a particular implementation of the Distributed Routing for connection oriented networks. These networks typically multiplex many connections (or sessions) on a link using some form of logical "channel". Each packet sent on the link has a header which includes an arbitrary number identifying which logical connection that this packet belongs to. The call set up and the resource reservation process comprises the following steps:

- A connection request is specified by the user via a set of parameters including origin and destination address and data flow characteristics.
- The path determination is realized by the source node from its local routing Topology Database
- The route reservation is sent out in a special message along the specified nodes. Said message, which is usually routed according to the previously described Source Routing technique, signals the nodes to set up their connection tables and to reserve their resources to provide the level of service required by the traffic type (for example, a bandwidth reservation on each of the links of the path).
- The tables update reflects the changes in the availability of the network resources. The information is sent to every node in the network.

The Label Swapping technique requires that the connection tables be set up and maintained dynamically in each node. This restriction makes datagram transport quite inefficient. However, due to the low packet overhead, this technique is particularly adapted to the transmission of very short packets (for example real-time voice connections).

Reserved and Non-Reserved Traffic

On large Networks with disparate traffic, two types of communications can be defined:

- The Reserved Communications for which the user is expecting from the network a committed bandwidth reserved and a guaranteed quality of service.
- The Non-Reserved Communications for which the expected service is "best effort delivery". Data are delivered as fast as possible when it is possible.

While the connectionless routing modes are quite efficient to route packets that does not require any reservation nor quality of service, connection oriented routing is well adapted to route packets when bandwidth reservation and quality of service are expected to be provided. In other words, connectionless routing suits non-reserved traffic requirements while connection oriented routing suits reserved traffic better. For this reason, it looks difficult to mix these two types of traffic, reserved and non-reserved, in a single connection oriented network. The problem to solve is the fairness between the two. Non-reserved traffic is important and must be transmitted with reasonable delay and quality (loss, corruption, . . . ): this is the interest of the user. But this is also this interest of the network. Most of the time, when facing a delay or quality problem, users with non-reserved traffic try to retransmit the data and therefore overload the network. The set up of reserved connections does not need to take into account non-reserved traffic, because, by definition, reserved traffic takes always priority over non-reserved traffic. The problem of fairness is then the problem of finding a path for the non-reserved traffic taking advantage of bandwidth holes.

SUMMARY OF THE INVENTION

The present invention discloses a method in a packet switching communication network comprising a plurality of nodes interconnected with transmission links, of determining a route between an origin node and a destination node for the transmission of packets without bandwidth reservation, said method characterized in that it comprises the steps of:

weighing each transmission link with a weighing function $w'_{ij}$ dependent of both reserved and non-reserved traffic, so that:
- the more traffic,
- the more reserved bandwidth,
- the higher the weight.

determining the optimal route between the origin and the destination node by selecting links of lowest weights Furthermore, said weighing function is dependent of the traffic exceeding the reservable bandwidth.

Said weighing function $w'_{ij}$ is the result of the product of:
- a Bounded Total Traffic Weight $w_{BT,ij}$,
- an Excess Traffic Weight $w_{E,ij}$, and
- a Reserved Traffic Weight $w_{R,ij}$.

Said step of selecting links with lowest weight includes the step of minimizing the total weight over the route, or minimizing both hop count and total weight over the route, and utilizes a Bellmann-Ford algorithm.

The present invention further discloses a communication node comprising means for carrying out the method of determining a route between an origin node and a destination node for the transmission of packets without bandwidth reservation, said node comprising one or more communication adapters for receiving or transmitting data packets, a route controller for allocating, controlling and managing network resources, and a topology database, updated by means of network control messages, for storing the network configuration and the representation of the traffic load on the transmission links.

BRIEF DESCRIPTION OF THE DRAWINGS

FIG. 4 shows the portion of the Topology Database containing the information related to the present invention.

DESCRIPTION OF THE PREFERRED EMBODIMENT

High Speed Communications

Figure 2:
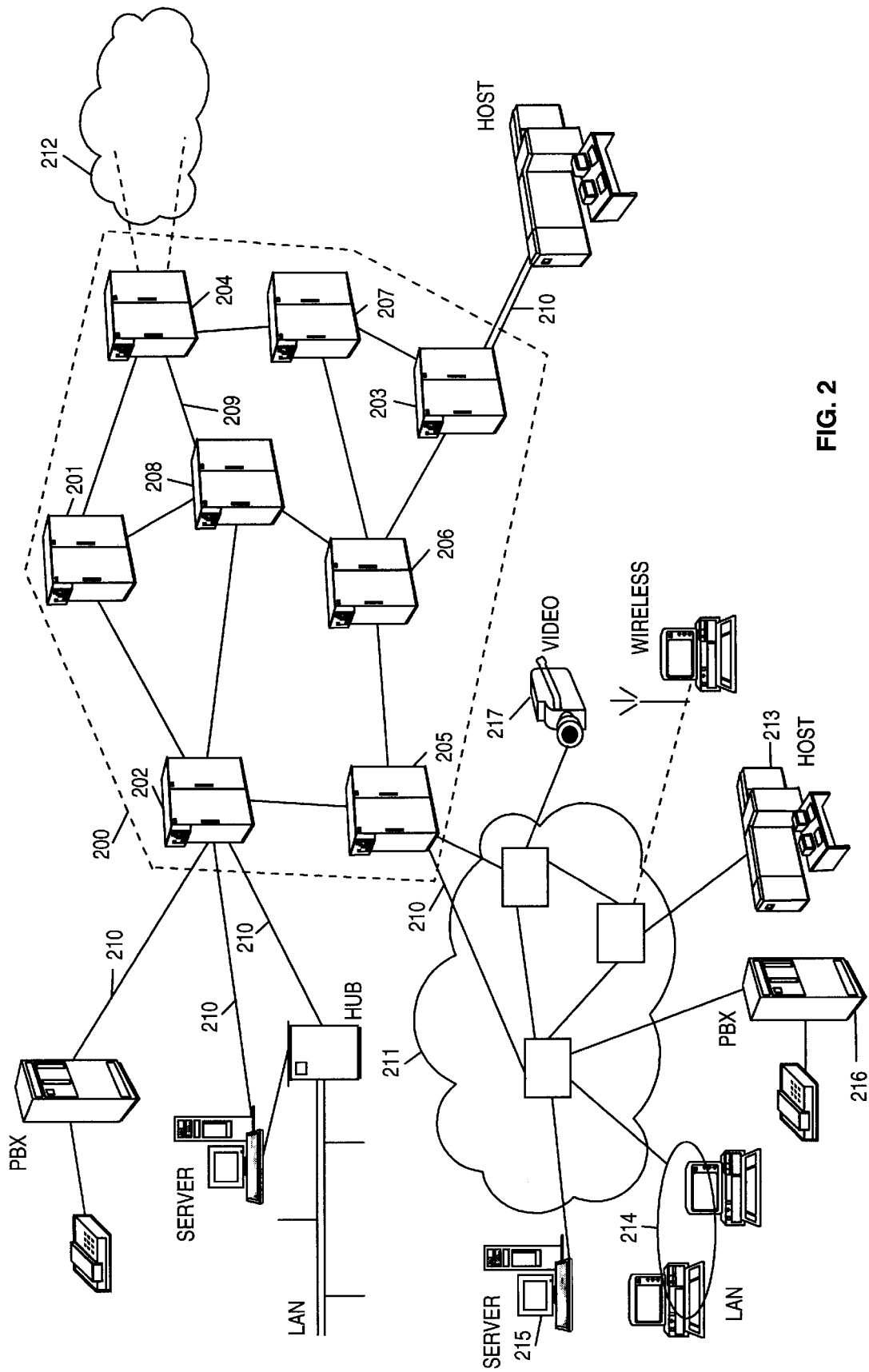
FIG. 2 shows a typical model of high speed packet switching network including the nodes claimed in the present invention.

As illustrated in FIG. 2, a typical model of communication system is made of several user networks (212) communicating through a high performance network (200) using private lines, carrier provided services, or public data networks. Each user network can be described as a set of communication processors and links (211) interconnecting large computers used as enterprise servers (213), user groups using workstations or personal computers attached on LAN (Local Area Networks 214), applications servers (215), PBX (Private Branch eXchange 216) or video servers (217). These user networks, dispersed in different establishments, need to be interconnected through wide area transport facilities and different approaches can be used for organizing the data transfer. Some architectures involve the checking for data integrity at each network node, thus slowing down the transmission. Others are essentially looking for a high speed data transfer and to that end the transmission, routing and switching techniques within the nodes are optimized to process the flowing packets towards their final destination at the highest possible rate.

The present invention belongs essentially to the latter category and more particularly to the fast packet switching network architecture detailed in the following paragraphs.

High Performance Packet Switching Networks

The general view in FIG. 2 shows a fast packet switching transmission system comprising eight nodes (201 to 208) each node being interconnected by means of high speed communication lines called Trunks (209). The access (210) to the high speed network by the users is realized through Access Nodes (202 to 205) located at the periphery. These Access Nodes comprise one or more Ports, each one providing an access point for attaching external devices supporting standard interfaces to the network and performing the conversions required to transport the users data flow across the network from and to other external devices. As example, the Access Node 202 interfaces respectively a Private Branch eXchange (PBX), an application server and a hub through three Ports and communicates through the network by means of the adjacent Transit Nodes 201, 206 and 208.

Switching Nodes

Each network node (201 to 208) includes a Routing Point where the incoming data packets are selectively routed on the outgoing Trunks towards the neighboring Transit Nodes. Such routing decisions are made according to the information contained in the header of the data packets. In addition to the basic packet routing function, the network nodes also provide ancillary services such as:

the determination of routing paths for packets originated in the node, directory services like retrieving and updating information about network users and resources, the maintaining of a consistent view of the physical network topology, including link utilization information, and the reservation of resources at access points of the network.

Each Port is connected to a plurality of user processing equipments, each user equipment comprising either a source of digital data to be transmitted to another user system, or a data sink for consuming digital data received from another user system, or, typically, both. The interpretation of the users protocols, the translation of the users data into packets formatted appropriately for their transmission on the packet network (200) and the generation of a header to route these packets are executed by an Access Agent running in the Port. This header is made of Control and Routing Fields.

The Routing Fields contain all the information necessary to route the packet through the network (200) to the destination node to which it is addressed. These fields can take several formats depending on the routing mode specified (connection oriented or connectionless routing mode).

The Control Fields include, among other things, an encoded identification of the protocol to be used in interpreting the Routing Fields.

Routing Points

Figure 3:
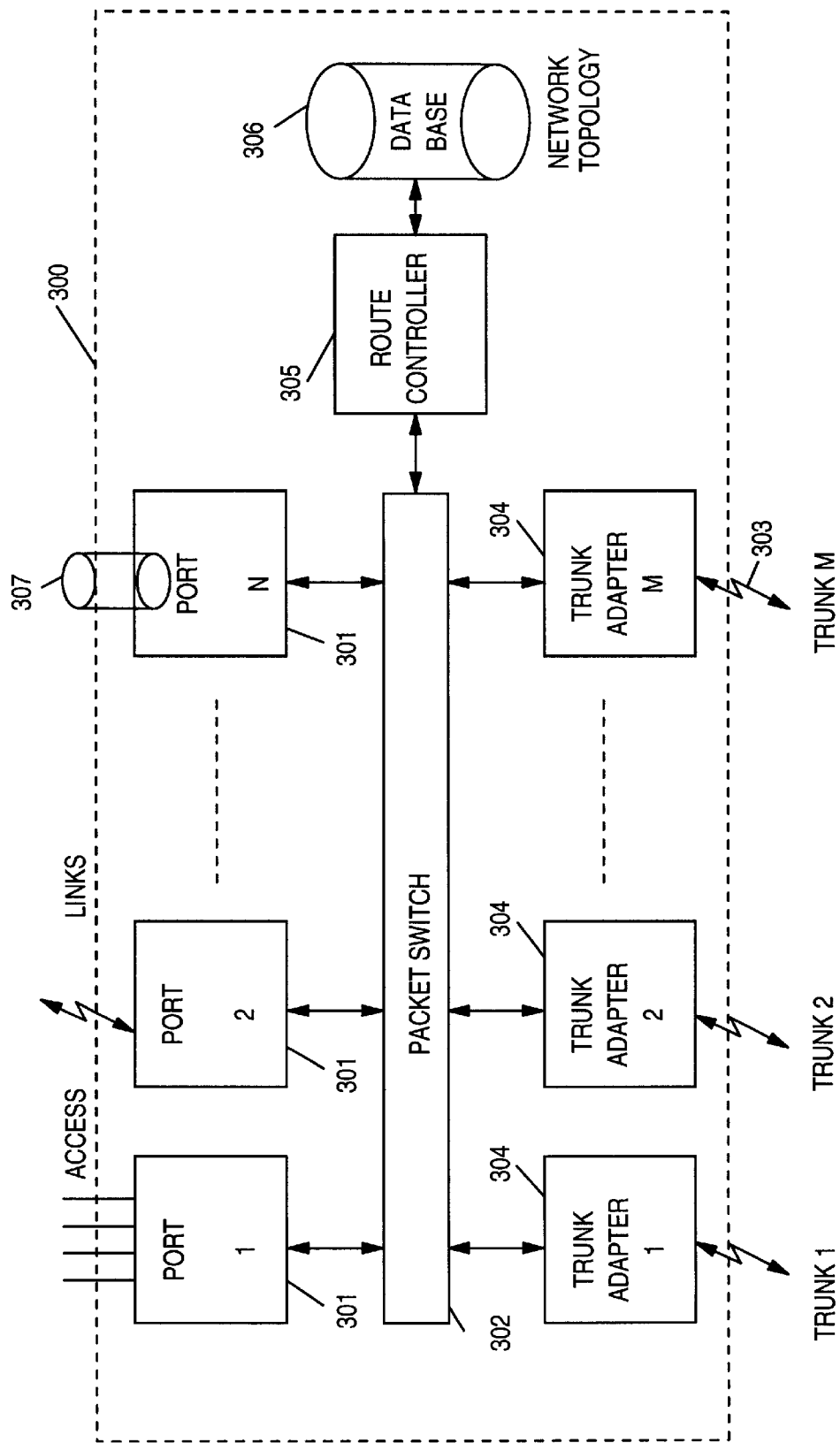
FIG. 3 describes a high speed Routing Point according to the present invention.

FIG. 3 shows a general block diagram of a typical Routing Point (300) such as it can be found in the network nodes (201 to 208) illustrated in FIG. 2. A Routing Point comprises a high speed packet Switch (302) onto which packets arriving at the Routing Point are entered. Such packets are received:

from other nodes over high speed transmission links (303) via Trunk Adapters (304).

from users via application adapters called Ports (301).

Using information in the packet header, the adapters (304, 301) determine which packets are to be routed by means of the Switch (302) towards a local user network (307) or towards a transmission link (303) leaving the node. The adapters (301 and 304) include queuing circuits for queuing packets prior to or subsequent to their launch on the Switch (302).

The Route Controller (305) calculates the optimum paths through the network (200) so as to satisfy a given set of quality of service specified by the user and to minimize the amount of network resources used to complete the communication path. Then, it builds the header of the packets generated in the Routing Point. The optimization criterion includes the number of intermediate nodes, the characteristics of the connection request, the capabilities and the utilization of the Trunks in the path . . . .

All the information necessary for the routing, about the nodes and transmission links connected to the nodes, are contained in a Network Topology Database (306). Under steady state conditions, every Routing Point has the same view of the network. The network topology information is updated when new links are activated, new nodes added to the network, when links or nodes are dropped or when link loads change significantly. Such information is originated at the network node to which the resources are attached and is exchanged by means of control messages with all other Path Servers to provide the up-to-date topological information needed for path selection (such database updates are carried on packets very similar to the data packets exchanged between end users of the network). The fact that the network topology is kept current in every node through continuous updates allows dynamic network reconfigurations without disrupting end users logical connections (sessions).

The incoming transmission links to the packet Routing Point may comprise links from external devices in the local user networks (210) or links (Trunks) from adjacent network nodes (209). In any case, the Routing Point operates in the same manner to receive each data packet and forward it on to another Routing Point as dictated by the information in the packet header. The fast packet switching network operates to enable a communication between any two end user applications without dedicating any transmission or node facilities to that communication path except for the duration of a single packet. In this way, the utilization of the communication facilities of the packet network is optimized to carry significantly more traffic than would be possible with dedicated transmission links for each communication path.

Topology Database (TDB)

The Topology Data Base contains information about nodes, links, their properties, and the bandwidth allocation. The topology information is replicated in each node of the network. An algorithm guarantees the correctness of each node's Topology Database when links and nodes are added or deleted or when their characteristics change. The database comprises:

the physical topology of the network which includes static information like physical characteristics of nodes and links, the state of nodes and links, and the link utilization which includes dynamic characteristics like current bandwidth (used and reserved), real time measurements . . . .

Figure 5:
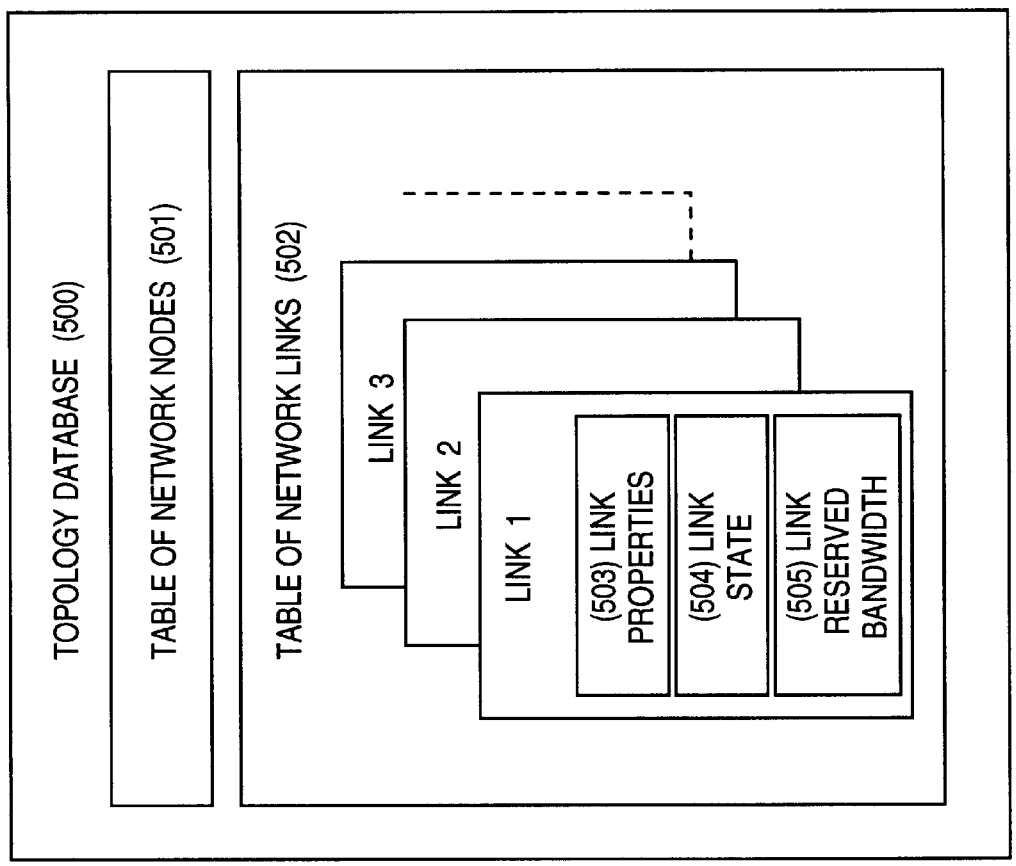
FIG. 5 describes the general structure of the Topology Database.

The general organization of the Topology Database is shown in FIG. 5. To each resource in the network, nodes (501) or links (502), is associated an entry in the database. In particular, each link entry includes the following characteristics:

(503) the link physical properties:
 transmission medium and speed,
 routing mode supported,
 maximum packet size,
 link buffer capacity,
 propagation delay,
 bandwidth reservation supported . . . .
(504) the link state:
 on-line (link can accept user connections),
 quiesce (link cannot accept additional user connections, but existing connections continue),
 off-line (link cannot accept user connections and existing connections are cancelled) . . . .
(505) the link utilization:
 real time measurements,
 reserved bandwidth, . . . .

Bandwidth Reservation

Most of the high speed connections are established on a reserved path to guarantee the bandwidth and the quality of service requested by the user. The path across the network is computed in response to each connection request by the originating node. The computed path is based on the parameters characterizing the network connection's requirements and on link capacity and load information maintained in the Topology Database of each network node. The originating node sends a reservation request to the end node. As the bandwidth request packet flows along the chosen path, each transit node determines whether it has enough capacity to accept the new connection. If the connection is accepted, the requested bandwidth is reserved. Changes are reflected in every node of the network by means of update messages.

FIG. 4 shows in a table, some of the information stored in the Topology Database. Though all characteristics of the links are listed in each node, in the present application only a few will be described:

Maximum Packet Size (bytes) $mps_{ij}$
 $mps_{ij}$ is defined as the maximum packet size supported by the link between nodes i and j.

Total Capacity (bps) C
 The Topology Database contains, for each link, its Total Capacity. The value $C_{ij}$ represents the total bandwidth available on the link between nodes i and j.

Total Reserved Equivalent Capacity (bps) $\hat{C}_{R,ij}$
 For a connection k on a link between nodes i and j, the simplest way to provide low/no packet loss would be to reserve the entire bandwidth requested by the user. However, for bursty user traffic, this approach can waste a significant amount of bandwidth across the network. To save resources, the bandwidth amount actually reserved is equal to an "Equivalent Capacity" $\hat{c}_{k,ij}$, said Equivalent Capacity being a function of the source characteristics and of the network status. The bandwidth reservation falls somewhere between the average bandwidth required by the user and the maximum capacity of the connection.

The value $$\hat{C}_{R,ij} = \hat{C}_{R,ij}^K = \sum_{k=1}^{K} \hat{c}_{k,ij} = \text{sum}$$

of the reserved Equivalent Capacities represents the total bandwidth reserved on the link between nodes i and j by K connections already established. If the difference between this already reserved link Equivalent Capacity $\hat{C}_{R,ij}$ and the Total Reservable Capacity of the link $rf \times C_{ij}$ is less than the bandwidth requested by a new reserved connection then the link cannot be selected. However, the link may be selected for a non-reserved connection where no explicit bandwidth reservation is needed.

Total Bandwidth used by Non-Reserved Traffic (bps) $M_{NR,ij}$
 The value $M_{NR,ij}$ represents the total load or bandwidth currently used by non-reserved traffic as measured on the link between nodes i and j.

Total Capacity Used (bps) $\hat{C}_{T,ij}$
 The Total Bandwidth Used $\hat{C}_{T,ij}$ on the link between node i and node j is computed by adding the total reserved bandwidth $\hat{C}_{R,ij}$ and the measured bandwidth $M_{NR,ij}$ used by non-reserved traffic.

Reservable Fraction (%) rf
 As might be expected, one of the critical characteristics of transmission links is the fraction of the link capacity effectively available. Links cannot be loaded up to a theoretical maximum load (bandwidth) for two reasons:
 first, to set aside bandwidth for network control functions, and
 secondly, to keep the loss probabilities and queueing delays low in the case of short term bandwidth violations by the different traffic sources.

The reservable fraction of a link rf is the effective percentage of the Total Capacity $C_{ij}$ that can be reserved on the link between nodes i and j to maintain a reasonable quality of transmission. If $C_{ij}$ is the Total Capacity of the link, then $R_{ij}=rf \times C_{ij}$ is the Reservable Capacity of this link ($\hat{C}_{ij} \leq R_{ij} \leq C_{ij}$).

Note: For most network architectures, no more than 85% of the total bandwidth of a link $C_{ij}$ can be explicitly reserved for user traffic (rf<0.85).

Path Selection
Selection Criterions

The purpose of the Path Selection process is to determine the best way to allocate network resources to connections both to guarantee that user quality of service requirements are satisfied and also to optimize the overall throughput of the network. The Path Selection process must supply to the requesting user a path over the network over which a point-to-point connection will be established, and some bandwidth will be reserved if needed. The Path Selection algorithm uses as input parameters in one hand the user requirements and on the other hand the status of the network links and nodes as maintained in the Topology Database. The Path Selection process selects the "best" path based on the following criterions:

Quality of Service

The connection's quality of service requirements are to be satisfied throughout the life of the connection. There are a large number of variables that determine the performance of a network. However, the quality of service can be defined as the set of measurable quantities that describe the user's perception of the service offered by the network. Some of these quantities have an effect upon how paths are computed, for example the Packet Loss Probability or the End-to-end Transit Delay: the sum of propagation delays along a computed path may not violate the End-to-end Transit Delay specifications.

Minimum Hop

The path shall consist of as few links as feasible to support the connection's quality of service requirements, thus minimizing the amount of network resources as well as processing costs to support the connection. The path computation is based on the links utilization at the time the connection is requested.

Load Balancing

Among a minimum hop path, a path with "lightly loaded" links is preferred over a path with "more heavily loaded" links based on the network conditions at the time of path selection. The load of a link depend of the customer criterions: it can be an increasing function of the total reserved bandwidth of the link, proportional to the amount of traffic actually measured on the link, . . . . When the path load (sum of the load of the links over the selected path) is the preponderant criterion of selection, the path of lesser load is chosen.

A path with minimum load will be preferred when specific quality of service constraints are specified (maximum delay for example) or when connections must be routed to insure an effective load balancing in the network. The hop count, however, is a direct measure of the amount of resources required to implement a given path and hence is also of considerable importance in selecting a path. The problem is to select a path between an origin node and a destination node which has a minimum hop count, a minimum path load, and which does not utilize an inordinate amount of network resources.

The object of the present invention is to consider both reserved and non-reserved traffic to determine also for non-reserved connections the best path within the network.

Routing Algorithms
Bellman-Ford Algorithm

There are several possible adaptive routing algorithms to compute an optimal path between nodes in a packet network. The Bellman-Ford algorithm described by D. P. Bertsekas in "Dynamic Programming: Deterministic and Stochastic Models", pages 318–322, Prentice-Hall, 1987, Englewood Cliffs, N.J., and D. P. Bertsekas and R. Gallager in "Data Networks", pages 387–417, Prentice-Hall, 1992, Englewood Cliffs, N.J. is one of the most currently used in fast packet packet switching networks. The objective of the algorithm is to find a path joining two nodes with the minimum load, the load being defined to reflect the congestion of the link. The algorithm starts from the source node and first find the lightest path loads subject to the constraint that the paths contain at most one link. Then, it find the lightest path loads with a constraint of paths of at most two links, and so forth.

Let

N the number of nodes (labeled 1, 2, . . . , N).

M the number of unidirectional links.

It is assumed that there is at most one unidirectional link going from one node to another, and so a link can be identified by its end points.

h the number of hops,

D(i,h) the lightest ($\leq$h) path load from source node 1 to node i.

By convention D(1,h)=0 for all h.

$d_{ij}$ the load of the link connecting node i to node j.

By convention $d_{ij}=\infty$ if nodes i is not connected to node j.

Initially D(i,0)=$\infty$ for all i$\neq$1
For each successive 0$\leq$h, $$D(i,h+1)=\min_j[D(j,h)+d_{ji}]$$

$j=1, \ldots, N$ for all $i \neq 1$

A path can contain at most N−1 links. In the worst case, the algorithm must be iterated N−1 times, each iteration must be done for N−1 nodes, and, for each node, the minimization must be taken over no more than N−1 alternatives. Thus the amount of computation grows at worst as $N^3$.

Let D(i) be the lightest path load from node 1 to i, with D(1)=0, then the equation converges with h=N−1 and can be written:

$$D(i)=\min_j[D(j)+d_{ji}], \text{ for all } i \neq 1$$

$$D(1)=0$$

This is called Bellman's equation and expresses that the lightest path load from node 1 to i is the sum of the path loads to the node before i (on the lightest path) plus the load of the final link of the path.

Modified Bellman-Ford Algorithm

As described with the Bellman-Ford algorithm, one of the major criterion for selecting paths between nodes in packet networks is the minimum path load. However, the hop count, on the other hand, is a direct measure of the amount of resources required to implement a given path and hence is of considerable importance in selecting paths. The hop count is defined as the number of links used to construct the path between two nodes. A selected path need not be a minimum hop count path since congestion on the network links may force the choice of a larger hop count path. However, such longer alternate paths cannot be allowed to grow without limit since inordinate amounts of network resources might be committed to one path, resulting in further congestion for other paths and forcing yet longer hop count paths to be selected for yet other connections. The long term network throughput could thereby be adversely affected. The problem, then, is to select a path between an origin node and a destination node which has a minimum hop count, a minimum path load, which does not utilize an inordinate amount of network resources.

The goal of the Modified Bellman-Ford algorithm is to find a path, between a given source and destination node pair, with a minimum number of links connecting the source and the destination node and with a minimum path load. The algorithm starts from the source node and progresses by increasing the hop count (the number of links) until it finds a feasible path. At each hop count h, the algorithm finds the lightest path length from the source node to each intermediate node with exactly h links.

Let D(i,h) the lightest path load from the source node to the node i exactly h hops:

$$D(i,h) = \min_j [D(j,h-1) + d_{ji}], j=1, \ldots, N \text{ for all } i \neq 1$$

where, by convention, $d_{ji} = \infty$ if link between nodes i and j does not exists (which include the case i=j).

Let s, the source node and d, the destination node, the algorithm stops at hop count $h^x$, $D(d,h^x)$ being the lightest path load among all the minimum hop feasible paths.

The difference between the Bellman-Ford and the Modified Bellman-Ford algorithms is that in the Bellman-Ford keeps going until it finds a path with the smallest path length (It stops when the lightest path load to each intermediate node cannot be further reduced or when all hop counts have been tried).

Path Selection for Reserved Connections

A method for selecting a path for reserved connections has been disclosed European Patent Application EP-0-568-477 entitled "Methods and Apparatus for Optimum Path Selection in Packet Transmission Networks". When selecting the best path for a reserved connection, the type of load used for each link is the "Weight" which is an increasing function of the amount of the reserved bandwidth. The Weight represents the ability of a link to support a new connection. A current Weight definition for reserved connections on a link is the following:

$$w_{ij} = \frac{C_{ij}}{\left(C_{ij} - \hat{C}_{ij}^{(1)}\right)\left(C_{ij} - \hat{C}_{ij}^{(2)}\right)}$$

where:

$C_{ij}$ is the total capacity in bit per second (bps) of the link between nodes i and j.

$\hat{C}_{ij}^{(1)}$ is the capacity in bits per second (bps) reserved on the link before the new reserved connection.

$\hat{C}_{ij}^{(2)}$ is the capacity in bits per second (bps) reserved on the link including the bandwidth of the new reserved connection.

The Path Weight is the sum of the Weights of the links over the selected path:

$$W = \sum_{n=1}^{h} w_{ij}$$

where:

W is the Path Weight h is the path hop count, n is the current hop count, $w_{ij}$ is the Weight of the link between nodes i and j.

The more links are congested over the path, higher the Path Weight is.

The modified Bellman-Ford algorithm uses the following Weight minimization equation:

For each successive 0<h, $$W(i,h) = \min_j [W(j,h-1) + w_{ji}], j=1, \ldots, N \text{ for all } i \neq 1$$

Path Selection for Non-Reserved Connections

Non-reserved network connections do not have bandwidth set aside either implicitly or explicitly. The lowest delay priority is assigned to non-reserved traffic and the networks drops non-reserved packets when their buffer overflows at intermediate links. That is why the Path Transfer Delay and the Loss Probability are not part of the quality of service guaranteed to non-reserved connections.

Because the data profile over the connections is bursty and non deterministic, reserved traffic does not lead to a full links utilization except on peaks. Therefore, non-reserved traffic can be transmitted when some bandwidth is available on the links. The purpose of an efficient bandwidth management is to reserve on the links as much bandwidth as possible with a guaranteed quality of service, and to use the inherent remaining bandwidth to transport traffic from the users who are just expecting a "best effort" service. The fact that the conditions of transport for the non-reserved traffic are not constraining does not mean that this type of traffic is a not important: a fair "best effort" service is expected. That is the responsibility of the network bandwidth management process to take advantage of these "bandwidth holes" in a way to allow the non-reserved traffic to efficiently use them.

The Path Selection process according to the present invention, is using the following parameters for non-reserved connections:

the "Weight" of the path used as load measure, the maximum number of hops over the path, and the maximum packet size allowed on the path.

For determining the best path, the Non-Reserved Path Selection (NRPS) algorithm uses the well known Bellman-Ford algorithm, modified in the sense that the algorithm is stopped as soon as the target node is reached.

Path Weight

The value minimized by the algorithm is the Path Weight W' as described here after. A path has a Weight which is the sum of its links Weights. For nonreserved connections, the Path Weight is expressed by:

$$W' = \sum_{n=1}^{h} w'_{ij}$$

where:

W' is the Path Weight h is the path hop count, n is the current hop count, w'$_{ij}$ is the Weight representing both reserved and non-reserved traffic of the link between nodes i and j.

The Non-Reserved Path Selection procedure (NRPS) uses the modified Bellman-Ford algorithm with link Weight measure taking into account both reserved and non-reserved traffic.

For each successive 0<h, $$W'(i,h)=\min_j[W'(j,h-1)+w'_{ji}], j=1,\ldots,N \text{ for all } i \neq 1$$

The Weight w'$_{ij}$ used in the Non-Reserved Path Selection procedure according to the present invention, is made of three parts:

the Bounded Total Traffic Weight $w_{BT,ij}$,
the Excess Traffic Weight $w_{E,ij}$, and
the Reserved Traffic Weight $w_{R,ij}$ $$w'_{ij} = w_{BT,ij} \times w_{E,ij} \times w_{R,ij}$$

Bounded Total Traffic Weight

The Bounded Total Traffic Weight is derived from the Weight defined currently for reserved connections:

When $\hat{C}_{T,ij}^{(1)}$ and $\hat{C}_{T,ij}^{(2)}$ does not exceed the maximum link reservable capacity $R_{ij}$ given by $R_{ij}=rf \times C_{ij}$, then:

$$w_{BT,ij} = \frac{C_{ij}}{\left(C_{ij} - \hat{C}_{T,ij}^{(1)}\right)\left(C_{ij} - \hat{C}_{T,ij}^{(2)}\right)}$$

Whenever $\hat{C}_{T,ij}^{(1)}$ or $\hat{C}_{T,ij}^{(2)}$ exceeds the maximum link reservable capacity $R_{ij}$ given by $R_{ij}=rf \times C_{ij}$, then $\hat{C}_{T,ij}^{(1)}$ or $\hat{C}_{T,ij}^{(2)}$ is replaced by the value $R_{ij}$ and the Excess Traffic Weight is used as Weight coefficient for the computation of w'$_{ij}$.

When both $\hat{C}_{T,ij}^{(1)}$ and $\hat{C}_{T,ij}^{(2)}$ exceed the maximum link reservable capacity $R_{ij}$, the Bounded Total Traffic Weight is limited to a maximum value (constant) given by:

$$w_{max,BT,ij} = \frac{1}{C_{ij}(1-rf)^2}$$

where:

$C_{ij}$ is the total capacity of the link between nodes i and j.

$\hat{C}_{T,ij}^{(1)}$ is the capacity $\hat{C}_{R,ij}^{(1)}$ reserved on the link between nodes i and j by all the existing reserved connections plus the average capacity $M_{R,ij}^{(1)}$ used by all the existing non-reserved connections as measured in the link interface hardware.

$\hat{C}_{T,ij}^{(2)}$ is equal to capacity already reserved $\hat{C}_{T,ij}^{(1)}$ plus the average capacity $m_{NR,k}$ (bps) requested by the new non-reserved connection k.

When an average capacity $m_{NR,k}$ is not specified by the requested non-reserved connection, a default value (defined in each network node) is taken. This default value may, for example, depend on the type of transport protocol used on the non-reserved network connection.

To summarize, $w_{BT,ij}$ is the base link Weight representing the total traffic flowing on a network link. $w_{BT,ij}$ is limited to the maximum value $w_{max,BT,ij}$.

Excess Traffic Weight

As non-reserved connections must always be established even if there is no feasible path with enough free bandwidth on all path links, the Non-Reserved Path Selection process (NRPS) must be able to consider the cases where $\hat{C}_{T,ij}^{(2)} > R_{ij}$. The Bounded Total Traffic Weight is constant ($w_{BT,ij} = w_{max,BT,ij}$) and cannot increase anymore to take into account all bandwidth wished by the new non-reserved connection. The Excess Traffic Weight $w_{E,ij}$ handles these "heavily loaded network" situations which are specific to links supporting both reserved and non-reserved connections. It is used as a coefficient of $w_{BT,ij}$.

The Excess Traffic Weight is defined according to the following expression:

$$w_{E,ij} = \max\left(1, \frac{\hat{C}_{T,ij}^{(2)}}{R_{ij}}\right)$$

When $\hat{C}_{T,ij}^{(2)} \leq R_{ij}$, then $w_{E,ij}$ is assumed to have a constant value equal to 1.

where:

$\hat{C}_{T,ij}^{(2)}$ is equal to the capacity $\hat{C}_{R,ij}^{(1)}$ reserved on the link by all the existing reserved connections plus the average capacity $M_{NR,ij}^{(2)}$ used by all the existing non reserved connections and the new estimated non-reserved connection k:

$$NM_{R,ij}^{(2)} = M_{NR,ij}^{(1)} + m_{NR,k}$$

$R_{ij}$ is the reservable capacity of the link

Reserved Traffic Weight

Due to the particular nature of non-reserved traffic (lowest priority, uncommitted quality of service), it is also necessary to multiply $w_{BT,ij}$ by another coefficient to differentiate reserved and non-reserved traffic links and to favour links with low reserved traffic. Thus, non-reserved packets have a higher chance to flow over the network with the minimum delay.

The Reserved Traffic Weight is defined as follows:

$$w_{R,ij} = \frac{C_{ij}}{\left(C_{ij} - \hat{C}_{R,ij}\right)}$$

where:

$C_{ij}$ is the total capacity of the link between nodes i and j.

$\hat{C}_{R,ij}$ is the capacity reserved on the link between nodes i and j by all the existing reserved connections (with a maximum value of $R_{ij}$)

Note:

$w_{R,ij}$ is equal 1 to when no connection is reserved on the link ($\hat{C}_{R,ij}=0$) and increases quickly with the reservation of new connections. The link Weight w'$_{ij}$ increases in the same proportions.

$w_{R,ij}$ reaches its maximum value $w_{max,R,ij}$ when all reservable capacity of the link is reserved ($\hat{C}_{R,ij}=R_{ij}=rf \times C_{ij}$):

$$w_{max,R,ij} = \frac{1}{1-rf}$$

Traffic Weight Properties

Each Weight considered independently from the other has an effect on the link choice based on its specific properties.

Reserved Traffic Weight $w_{R,ij}$

The Reserved Traffic Weight is greater or equal to 1. When no traffic is reserved, $w_{R,ij}$ is equal to 1 and its effect on the link Weight is null. $w_{R,ij}$ only takes into account the reserved traffic, and thus, regardless of the non-reserved traffic load of the link, favours links with low reserved traffic.

The more traffic reserved, the higher $w_{R,ij}$, and the less the link is selected Bounded Total Traffic Weight $w_{BT,ij}$ The Bounded Total Traffic Weight takes into account both reserved and non-reserved traffic. It favours links with the lowest traffic, regardless of the type (reserved or non-reserved).

The more traffic, the higher $w_{BT,ij}$ and the less the link is selected

This Weight is bounded when traffic exceeds reservable link capacity. In that case, it is useless since it does not allow to differentiate links (see FIG. 1 when total traffic exceeds 1800 kbps)

Excess Traffic Weight $w_{E,ij}$

Basically, the Excess Traffic Weight takes the relay of $w_{BT,ij}$ to differentiate links where traffic (actual or requested) exceeds the reservable link capacity. $w_{E,ij}$ is equal to 1 (so has no effect on link Weight) as long as the estimated traffic is lower than the reservable link capacity ($\hat{C}_{(2)T,ij} \leq R_{ij}$). Then, it becomes greater than 1 when traffic increases over the reservable link capacity.

Note: The reserved traffic amount is not a measured value but is the maximum value subscribed by the users. For instance, 15 Mbps reserved traffic may have been subscribed on a 20 Mbps link by a connection that may effectively use less capacity during some time, while 7 Mbps of nonreserved traffic, for example, can be measured. The total (22 Mbps) is, in that case, higher that the reservable link capacity (17 Mbps=20 Mbps× 0.85).

The more traffic in excess, the greater $w_{E,ij}$, the less the link is selected.

These three Weights are, of course, interdependent also. The main effect of this interdependence can be expressed as follows:

1. $w_{E,ij}$ takes the relay of $w_{BT,ij}$ when it reaches its boundary, and allows to take into account traffic in excess.
2. The reserved traffic is significant in both Reserved Traffic Weight $w_{R,ij}$ and Excess Traffic Weight $w_{E,ij}$ while non-reserved traffic is only represented in Excess Traffic Weight $ew_{E,ij}$. Links with low reserved traffic (even with high non-reserved traffic) are favoured as opposed to links with high reserved and low non-reserved traffic.

Traffic Weights Computation

Here are some practical examples of link Weight computation:

No Reserved Capacity Case: Weight $w'_1$

Link Weight computation for a non-reserved connection k:

Non-reserved connection: $m_{NR,k}=5\times 10^5$ bps.

No reserved capacity on link: $\hat{C}_R=0$ bps.

Variable non-reserved traffic.

2 Mbps, E1 link: $C=2\times 10^6$ bps.

| $\hat{C}_R \times 10^5$ | $M_{NR} \times 10^5$ | $m_{NR,k} \times 10^5$ | $w_{BT} \times 10^6$ | $w_E$ | $w_R$ | $w' \times 10^6$ |
|---|---|---|---|---|---|---|
| 0 | 0 | 5 | 0.67 | 1 | 1 | 0.67 |
| 0 | 4 | 5 | 1.14 | 1 | 1 | 1.14 |
| 0 | 8 | 5 | 2.38 | 1 | 1 | 2.38 |
| 0 | 12 | 5 | 8.33 | 1 | 1 | 8.33 |
| 0 | 16 | 5 | 16.7 | 1.24 | 1 | 16.7 |
| 0 | 20 | 5 | 22.2 | 1.47 | 1 | 22.2 |

Note: $w'_1 = w_{BT} \times w_E \times w_R$

Constant Reserved Capacity Case: Weight $w'_2$

Link Weight computation for non-reserved connection k:

Non-reserved connection: $m_{NR,k}=5\times 10^5$ bps.

Constant reserved capacity on link: $\hat{C}_R=8\times 10^5$ bps.

Variable non-reserved traffic.

2 Mbps E1 link: $C=2\times 10^6$ bps.

| $\hat{C}_R \times 10^5$ | $M_{NR} \times 10^5$ | $m_{NR,k} \times 10^5$ | $w_{BT} \times 10^6$ | $w_E$ | $w_R$ | $w' \times 10^6$ |
|---|---|---|---|---|---|---|
| 8 | 0 | 5 | 2.38 | 1 | 1.67 | 3.97 |
| 8 | 4 | 5 | 8.33 | 1 | 1.67 | 13.9 |
| 8 | 8 | 5 | 16.7 | 1.24 | 1.67 | 34.4 |
| 8 | 12 | 5 | 22.2 | 1.47 | 1.67 | 54.4 |

Note: $w'_2 = w_{BT} \times w_E \times w_r$

Constant Non-Reserved Traffic Case: Weight $w'_3$

Link Weight computation for non-reserved connection k:

Non-reserved connection: $m_{NR,k}=5\times 10^5$ bps.

Constant non-reserved traffic on link: $M_{NR}=8\times 10^5$ bps.

Variable reserved capacity.

2 Mbps E1 link: $C=2\times 10^6$ bps.

| $\hat{C}_R \times 10^5$ | $M_{NR} \times 10^5$ | $m_{NR,k} \times 10^5$ | $w_{BT} \times 10^6$ | $w_E$ | $w_R$ | $w' \times 10^6$ |
|---|---|---|---|---|---|---|
| 0 | 8 | 5 | 2.38 | 1 | 1 | 2.38 |
| 4 | 8 | 5 | 8.33 | 1 | 1.25 | 10.4 |
| 8 | 8 | 5 | 16.7 | 1.24 | 1.67 | 34.4 |
| 12 | 8 | 5 | 22.2 | 1.47 | 2.5 | 81.6 |

Note: $w'_3 = w_{BT} \times w_E \times w_R$

Traffic Weights Representation

Figure 1:
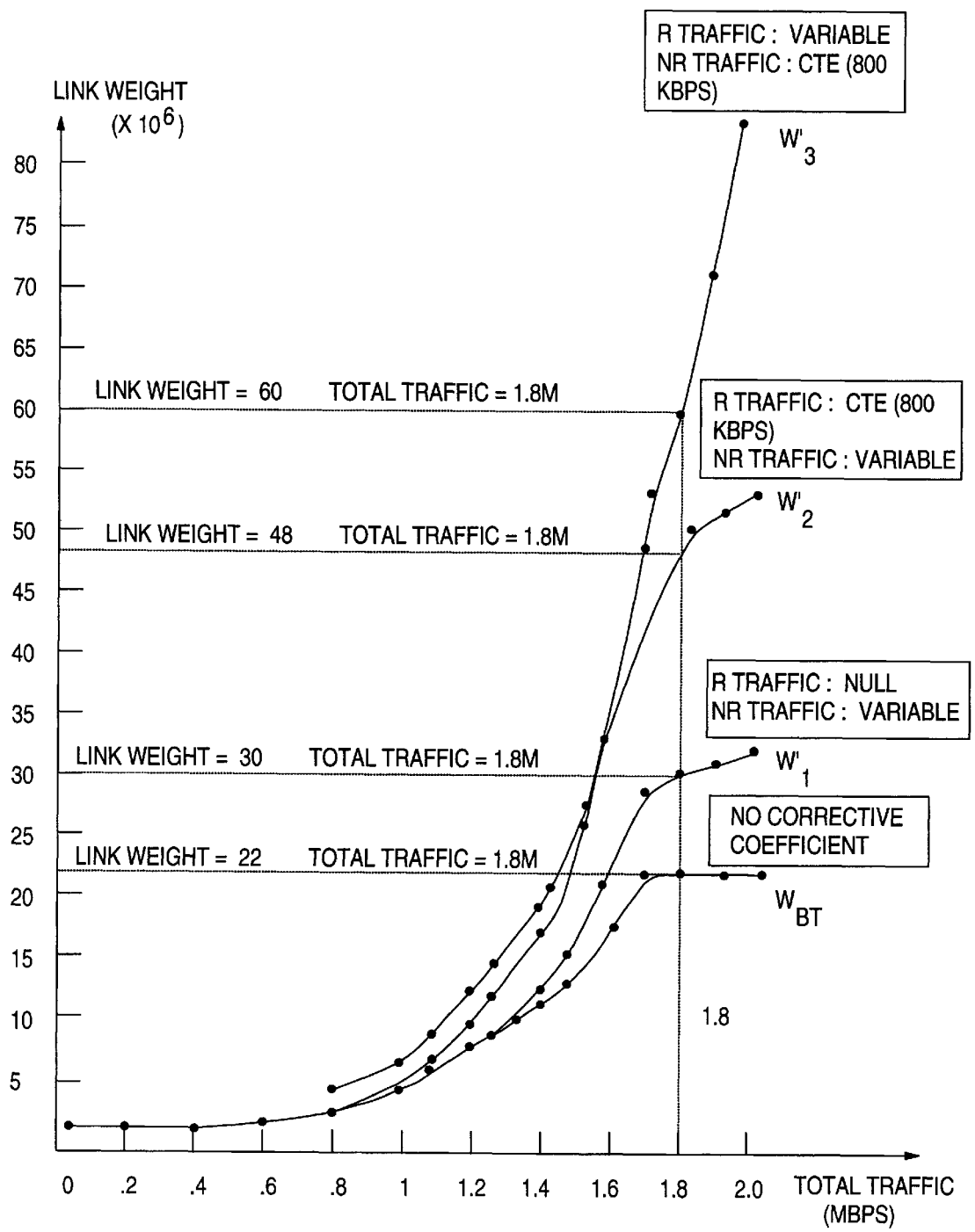
FIG. 1 shows the properties of the different traffic Weights used for selecting the optimal route according to the present invention.

FIG. 1 represents four curves:

The curve $w_{BT}$ shows that, when no corrective coefficient is applied to take into account traffic in excess, the curve become flat (at 1800 kbps) and the Weight does not allow to chose links after that limit is reached (while this choice is the more important).

The curve $w'_1$ shows that, when no traffic is reserved, the link is always preferred to links that have reserved connections (least Weight): $w'_1$ is below $w'_2$ and $w'_3$ for the same total traffic.

The curve $w'_2$: shows that, with a reserved traffic constant (equal 800 Kpbs), the Weight is always greater than the Weight computed with $w'_1$ (Only non-reserved traffic) for the same total traffic.

The curve $w'_3$: shows that, when the reserved traffic increases, the link Weight increase accordingly. For Instance, for a total traffic of 1.8 Mbps, the Weight in $w'_1$ is equal to 30 while it reaches 48 in $w'_2$ and 60 in $w'_3$, that means that the Weight computed in $w'_3$ is two times greater than the one in $w'_1$. In this particular example, with a total traffic of 1.8 Mbps, it is possible to select along the path two links with only non-reserved traffic ($w'_1$) for only one with reserved traffic ($w'_3$), assuming that the hop count is not a selection criteria.

The main advantages resulting of the computation of these Weights, object of the present invention, are:

1. Preferred links are those with the less total traffic.
2. When the total traffic is the same on several links, links with the less reserved traffic are preferred.

As non-reserved traffic has the lowest priority, the proposed algorithm strongly favours links with few reserved traffic in order to maintain a more acceptable response time even for non-reserved traffic.

Non Reserved Path Selection Procedure (NRPS)

Path request

Each connection request includes the following input parameters:
- the origin Node A,
- the destination Node Z,
- the estimation of bandwidth required for the new connection,
- the Weight measure used,
- the maximum hop count allowed,
- the maximum packet size needed,
- the minimum hop path or lightest path selection criterion.

For each non-reserved connection request, a path is selected by searching among all links the minimum Path Weight and eventually the minimum hop satisfying some constraints such as the packet size, the maximum delay, . . . . This operation is described in FIGS. 8 and 9.

Definition of Variables

The variables used in the Non Reserved Path Selection process (NRPS) are the following:

$mps_{ij}$ (bytes) is the maximum packet size supported by the link between nodes i and j, $w'_{ij}$ is the Weight of the link between nodes i and j, $W'(i,j)$ is the minimum cumulated Weight from origin node A to node i in h hops, $W'(i)$ is the minimum cumulated Weight from origin node A to node i in any hop count, h is the iteration index of the search algorithm, equal to the hop count, S(h) is the set of valid nodes reached in h hops, P is the set of links part of the best path searched between nodes A and Z, Z_REACHED is a flag set when a path from nodes A to Z has been found.

Initial Phase

In a first phase, the variables previously defined are initialized with the following values:

W'(A)=0
S(0)=0
For all nodes i≠A and for all h: W'(i,h)=∞
P=0
h=0
Z_reached=FALSE Path Computation Here are given as example, two illustrations of the Non Reserved Path Selection procedure.

Minimum Hop Path

Figure 6:
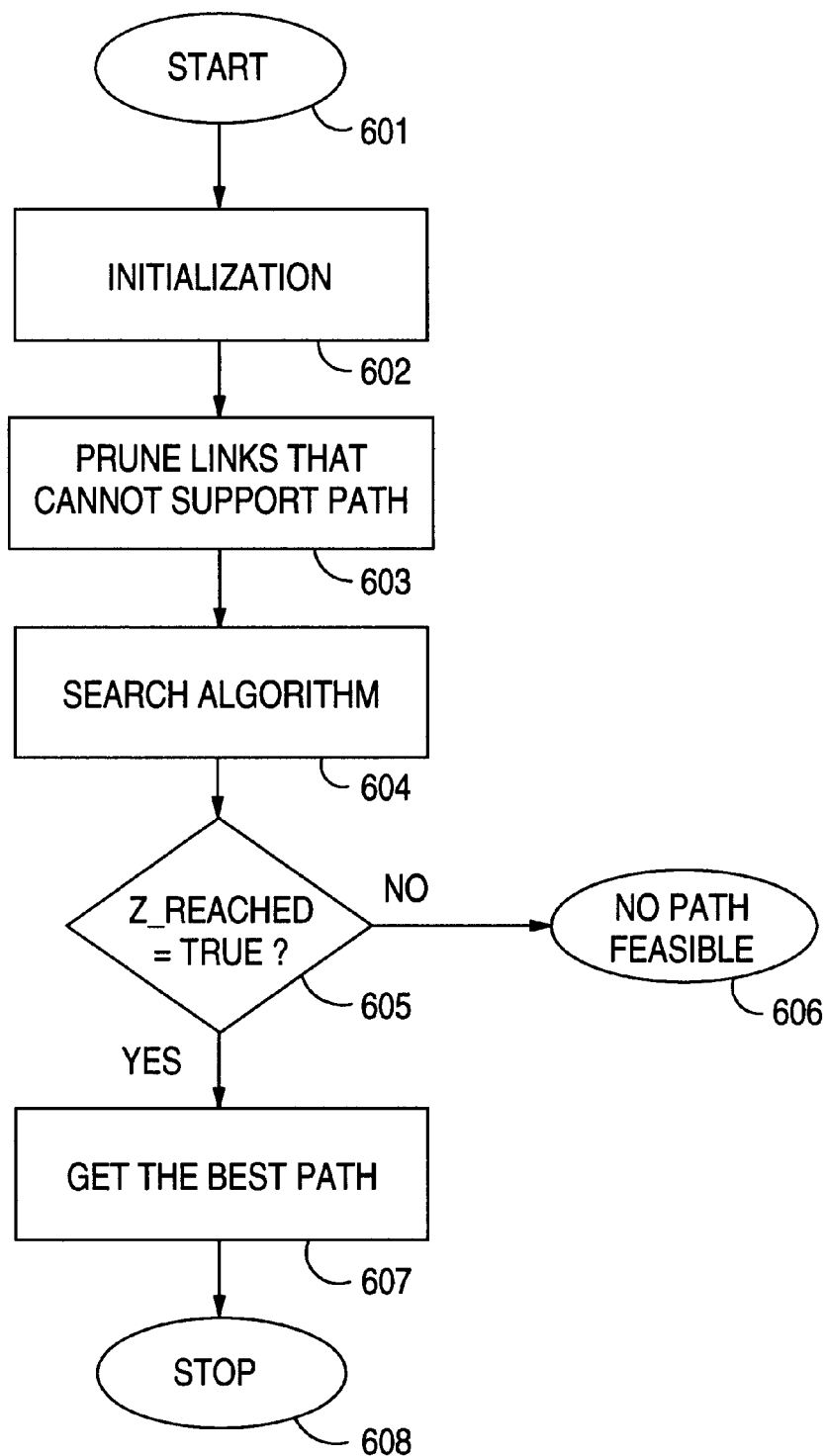
FIG. 6 shows a general flow chart of the path selection procedure according to the minimum hop criterion.

FIG. 6 shows a general flow chart of the path selection procedure according to the present invention when the "best" path criterion is the minimum hop path. The main advantage is to use as few network resources as possible.

(602) Starting at point (601), the variables are first initialized.

(603) Once initialization has been realized, links which cannot support the requested path, for example if their maximum packet size $mps_{ij}$ is less than the value requested for the path, are excluded from the search.

(604) After links pruning, the path search algorithm is activated to compute the path with minimum hop.

(605) A test determines whether the destination node Z has been reached or not:

(606) If destination node Z has not been reached, no path is feasible and the procedure is stopped at that point (606).

(607) If destination node Z has been reached, the path with the minimum hop and the lightest Weight is selected. The procedure then terminates in point (608).

Lightest Path

Figure 7:
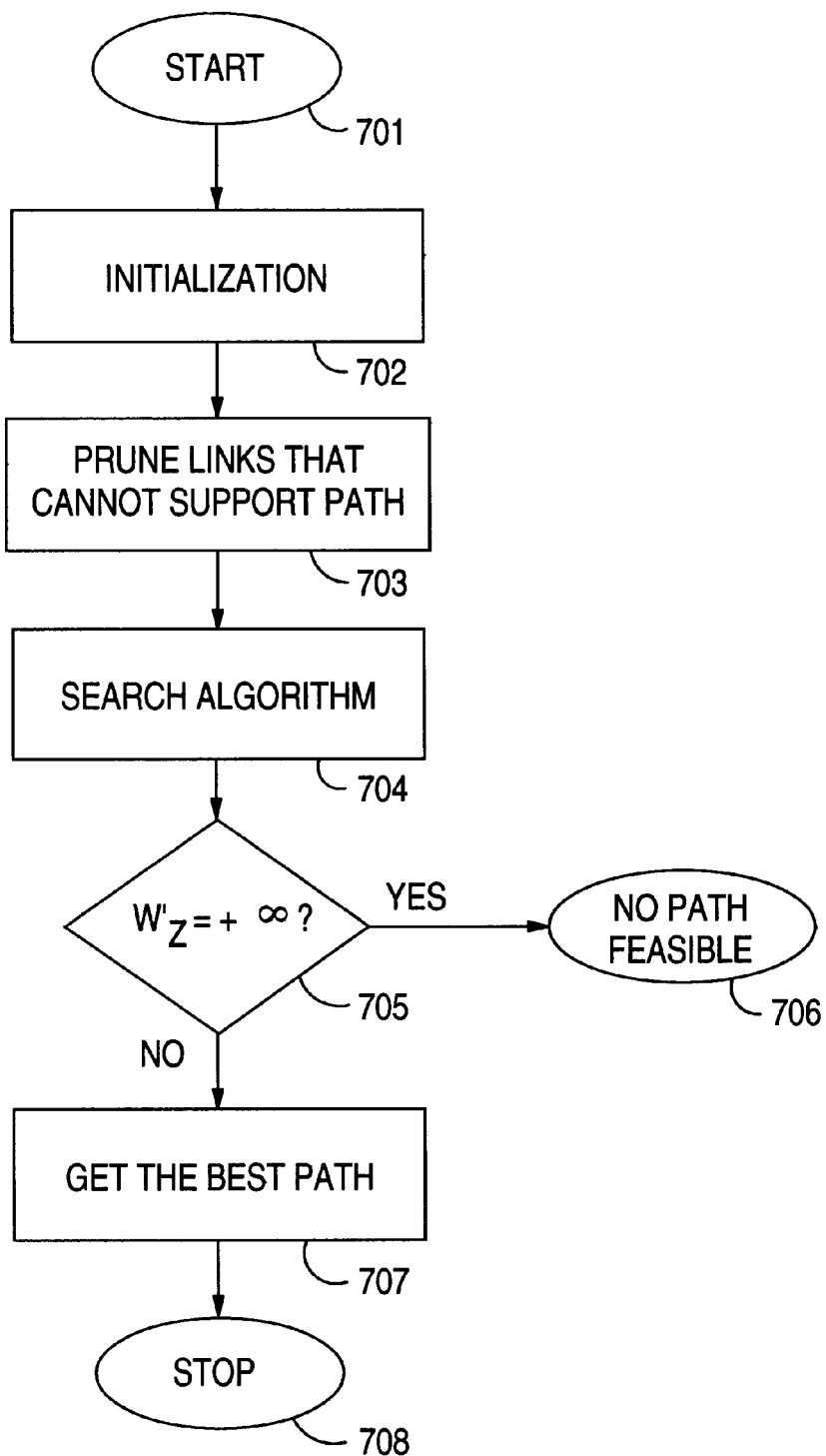
FIG. 7 shows a general flow chart of path selection procedure according to the absolute minimum path Weight criterion.

FIG. 7 shows a general flow chart of the path selection procedure according to the present invention when the "best" path criterion is the absolute minimum path Weight (not necessarily the minimum hop). The absolute lightest path is selected independently of the hop count to obtain, for example, an efficient network load balancing.

(702) Starting at point (701), the variables are first initialized.

(703) Once initialization has been realized, links which cannot support the requested path, for example if their maximum packet size $mps_{ij}$ is less than the value requested for the path, are excluded from the search.

(704) After links pruning, the path search algorithm is activated to compute the lightest path.

(705) A test determines whether the cumulated Weight W'(Z) of the destination node Z is infinite (no path has been found) or not:

(706) If the cumulated Weight is infinite, then destination node Z cannot be reached and no path is feasible.

(707) If destination node Z has been reached (if the cumulated Weight is not infinite), the lightest path is selected. The procedure then terminates in point (708).

Search Algorithm
Minimum Hop Path

Figure 8:
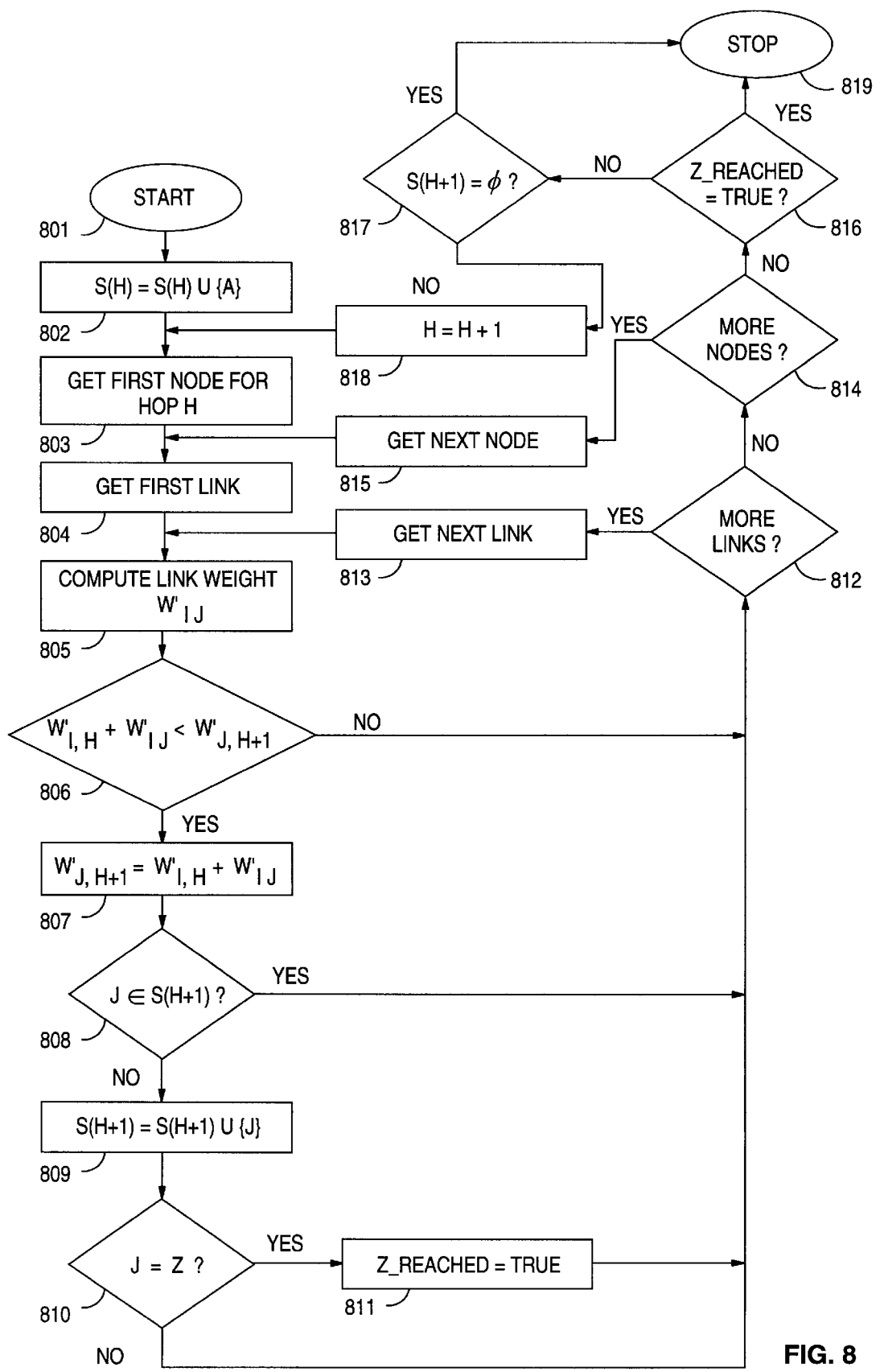
FIG. 8 shows a detailed flow chart of the search algorithm used for selecting the path with the minimum hop according to the present invention.

FIG. 8 shows a detailed flow chart of the modified Bellman-Ford algorithm used in step (604) for determining the best minimum-hop path with the lightest Weight.

(802) Starting at point (801), the origin node A is added to the previously empty set of nodes to explore S(h) (h=0 at starting point (801)).

(803) Because S(0)=S(0) U {A}, the first (and only) node to be visited with hop count h=0 is node A.

(804) The first link of the current visited node, called here link ij, is examined.

(805) The Weight $w'_{ij}$ of the link ij is computed according to the equations previously described in the present invention.

(806) The cumulated Weight of the current visited node (W'(i,h) at node i in h hops) added to the Weight $w'_{ij}$ of link ij is compared with the cumulated Weight of the node reached (W'(j,h+1) at node j in h+1 hops).

(812) If W'(i,h)+$w'_{ij} \geq$ W'(j,h+1), the current link does not bring a better possibility to reach node j and the next link of the current visited node i is examined.

(807) If W'(i,h)+$w'_{ij}<$W'(j,h+1), then a better possibility to reach the node j has been found. The cumulated Weight W'(j,h+1) of the node reached in h+1 hops, is updated with the better cumulated Weight value just found. The input link i,j associated with the node j Weight value is also stored at node j. The process goes on with step (808).

(808) A test determines whether the reached node j belongs to the set of nodes to visit in the next hop S(h+1) or not:

(812) If the node is already in the set of nodes to visit, then the next link of the current visited node i is examined.

(809) If the node is not already in the set of nodes to visit, then node j is added to said set. The process goes on with step (810).

(810) A test determines whether the reached node j is the path destination node Z or not:

(801) If node j is the destination node Z, then the Z_REACHED indicator is set to the value TRUE to reflect the fact that a feasible path from node A to node Z exists. the process goes on with step (812).

If node j is not the destination node Z, then the process goes on with step (812).

(812) A test determines whether other links belonging to the current visited node i exist or not:

(813) If other links exist, the next link ij between current visited node i and another reached node j is examined. The process goes on with step (805) already described.

If no more links exist, the process goes on with step (814).

(814) A test determines on whether other nodes in the S(h) set must be visited for the current h hop count or not:

(815) If other nodes exist, the next node j is examined and the process goes on with step (804) already described.

If no more nodes exist, the process goes on with step (816).

(816) A test determines whether the destination node Z has been reached or not:

(819) If the destination node Z has been reached (in hop h as we are running the minimum hop algorithm), the process stops.

If the destination node Z has not been reached, the process goes on with step (817).

(817) A test determines whether the set of nodes to visit in next hop S(h+1) is empty or not:

(819) If this set is empty, then no other node can be visited in next hop and the process stops.

(818) If there are nodes to visit in the next hop (h+1), then the current hop count h is incremented. The first node corresponding to the current hop count (803) is examined and the process goes on.

Lightest Path

Figure 9:
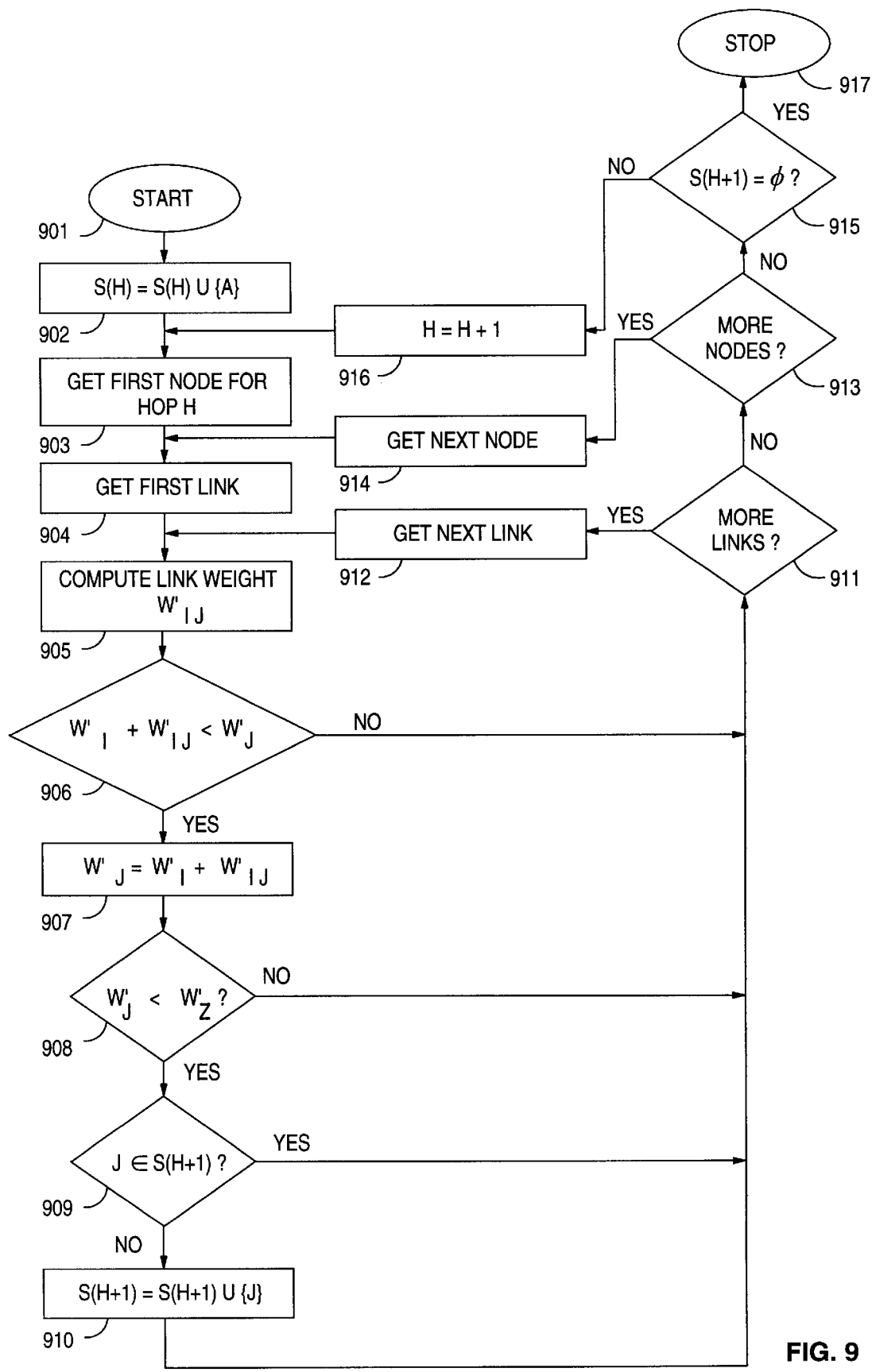
FIG. 9 shows a detailed flow chart of the search algorithm used for selecting the path with the minimum path Weight according to the present invention.

FIG. 9 shows a detailed flow chart of the modified Bellman-Ford algorithm used in step (704) to determine the least-weight path regardless of the hop-count.

(902) Starting at point (901), the origin node A is added to the previously empty set of nodes to explore S(h) (h=0 at starting point (901)).

(903) Because S(0)=S(0) U {A}, the first (and only) node to be visited for hop count h=0 is node A.

(904) The first link of the current visited node, called here link i, is examined.

(905) The Weight $w'_{ij}$ of the link i is computed according to the equations previously described in the present invention.

(906) The cumulated Weight of the visited node (W'(i) at node i in any number of hops) added to the Weight of link ij ($w'_{ij}$), is compared with the cumulated Weight W'(j,h+1) of the node reached at node j in any number of hops:

(907) If W'(i)+$w'_{ij}<$W'(j), then a better possibility to reach the node j has been found and the process goes on with step (907).

(911) If W'(i)+$w'_{ij} \geq$ W'(j), then the current link does not bring a better possibility to reach node j and the next link of the current visited node i is examined.

(907) The cumulated Weight of the node (regardless of the number of hops) W'(j) is updated with the better cumulated Weight value just found. The input link ij associated with the new node j Weight value is also stored at the node j.

(908) A test determines whether the cumulated Weight of the node W'(j) exceeds or not the smallest cumulated Weight to reach the destination W'(Z) (W'(Z) is infinite as long as destination Z has not been-reached by any path. Then, smallest value replaces previous smallest value obtained in steps 906 and 907).

(911) If the cumulated Weight of the node W'(j) exceeds the smallest cumulated Weight to reach the destination W'(Z), the current link does not bring a better possibility to reach node j. The next link of the current visited node i is examined If the cumulated Weight of the node W'(j) does not exceed the smallest cumulated Weight to reach the destination W'(Z), the process goes on with step (909).

(909) A test determines whether the reached node j belongs or not to the set of nodes to visit in the next hop S(h+1):

(911) If the node is already in the set, then the next link of the current visited node i is examined.

(910) If the node is not already in the set, node j is added to the set and the process goes on with step (911).

(911) A test determines Whether other links of the current visited node i must be tested or not:
(912) If other links exist, the next link ij between visited node i and another reached node j is examined. The process goes on with step (905) already described.
If no more links exist, the process goes on with step (913).
(913) A test determines whether other nodes of the S(h) set must be visited or not for the current h hop count:
(914) If other nodes exist, the next node j to visit is examined. The process goes on with step (904) already described.
If no more nodes exist in S(h), the process goes on with step (915).
(915) A test determines whether the set of nodes to visit in next hop is empty or not:
(917) If this set is empty, then no other nodes can be visited in next hop and the process stops.
(916) If there are nodes to visit in the next hop (h+1), then the current hop count h is incremented. The first node to visit with the current hop count is examined and the process goes on.

Best Path

Figure 10:
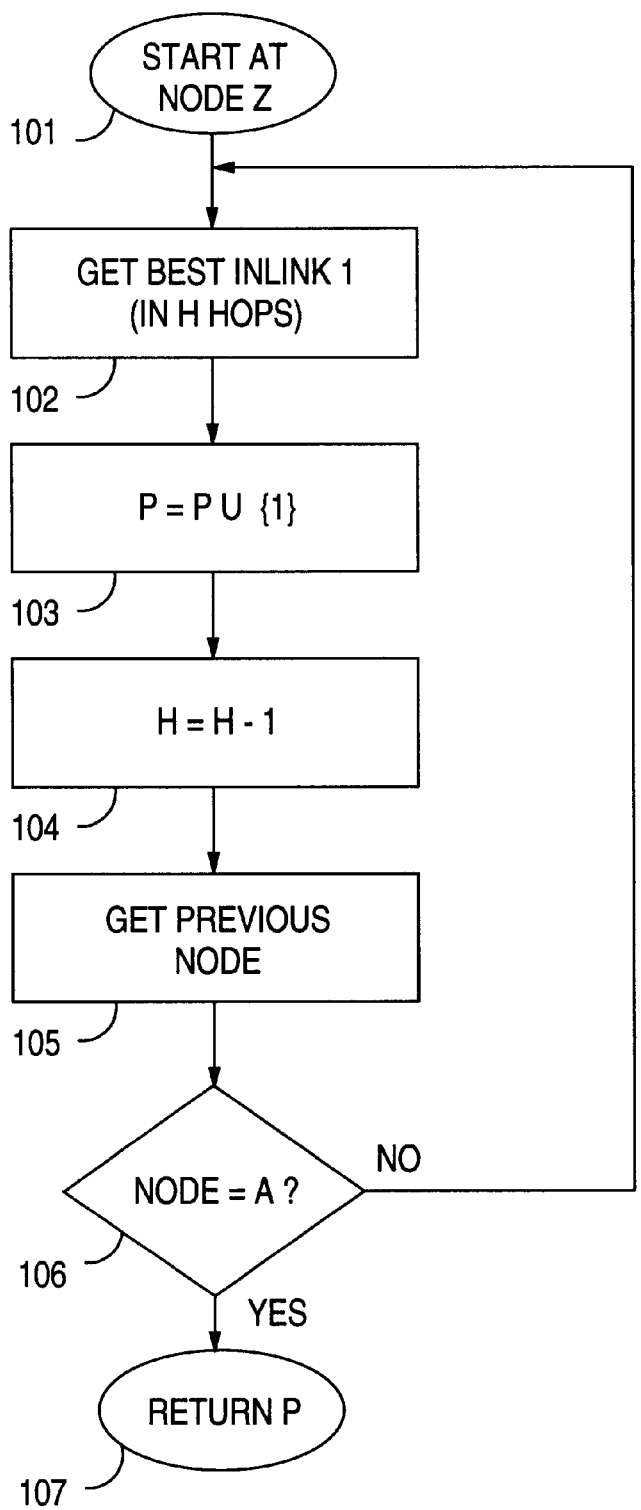
FIG. 10 shows the last step of the path selection process for obtaining the list of the links forming the path according to the present invention.

FIG. 10 shows a detailed flow chart of the algorithm used in step (607) and (707) to obtain the list of links forming the best path just found in steps (604) and (704). Once the search has succeeded and the destination node is reached, the links composing the selected path are obtained by assembling the best links associated with the nodes determined in the search algorithm. The assembling is done by retracing the nodes of the network starting at destination node Z.

(102) Starting from the destination node Z (101), the best node incoming link, for the path hop count h stored during the search algorithm in steps (604) and (704), is retrieved. The link is characterized by its lowest Weight in h hops W'(h,Z).
(103) The identified link is added to the current list P of links. Initially, the list P is empty.
(104) The hop count is decremented. Initially, the hop count is set at the path hop count determined by the search algorithm.
(105) the previous node, the one on the other end of the link, is retrieved.
(106) A test determines whether the origin node A is reached or not:
(106) If the origin node A is reached, the process stops (107) and P contains the list of all links.
(102) If the origin node A is not reached, the best link from current node is examined and the process goes on with step (102).

We claim:

1. For use in a packet switching communication network comprising a plurality of nodes interconnected with transmission links, said network carrying both reserved data traffic on connections to which network resources have been allocated and non-reserved data traffic on connections to which no network resources are allocated, a method of determining a route for non-reserved data traffic between an origin node and a destination node, said method comprising the steps of:

assigning a weight to each transmission link, said weight being directly related to both the existing allocation of resources on the link for reserved data traffic connections and the existing, actual utilization of the link for carrying both reserved and non-reserved data traffic; and selecting an optimal path by determining the combined weights of feasible paths between the origin node and the destination node and selecting the least weight path from the set of feasible paths.

2. The method of determining a route between an origin node and a destination node, according to claim 1, wherein said step of assigning a weight is dependent of both reserved and non-reserved traffic, so that the more traffic exceeding the reservable bandwidth, the higher the weight.

3. The method of determining a route between an origin node and a destination node, according to claim 2 by assigning a weight to each transmission link comprises the step of determining a Bounded Total Traffic Weight $w_{BT,ij}$:

When both $\hat{C}_{T,ij}^{(1)}$ and $\hat{C}_{T,ij}^{(2)}$ are below the maximum link reservable bandwidth $R_{ij}$, the Bounded Total Traffic Weight is equal to:

$$w_{BT,ij} = \frac{C_{ij}}{\left(C_{ij} - \hat{C}_{T,ij}^{(1)}\right)\left(C_{ij} - \hat{C}_{T,ij}^{(2)}\right)}$$

Whenever $\hat{C}_{T,ij}^{(1)}$ or $\hat{C}_{T,ij}^{(2)}$ exceed the maximum link reservable bandwidth $R_{ij}$ given by $R_{ij}$=rfx then $\hat{C}_{T,ij}^{(1)}$ or $\hat{C}_{T,ij}^{(2)}$ is replaced by the value $R_{ij}$;

When both $\hat{C}_{T,ij}^{(1)}$ and $\hat{C}_{T,ij}^{(2)}$ exceed the maximum link reservable bandwidth $R_{ij}$, the Bounded Total Traffic Weight is limited to the maximum value:

$$w_{max,BT,ij} = \frac{1}{C_{ij}(1-rf)^2}$$

where:

$C_{ij}$ is the total bandwidth of the link between nodes i and j;

$\hat{C}_{T,ij}^{(1)}$ is the bandwidth $\hat{C}_{R,ij}^{(1)}$ reserved on the link between nodes i and j by all the existing reserved connections plus the average bandwidth $M_{NR,ij}^{(1)}$ (bps) used by all the existing non-reserved connections;

$\hat{C}_{T,ij}^{(2)}$ is equal to the bandwidth already reserved $\hat{C}_{T,ij}^{(1)}$ plus the average bandwidth $m_{NR,k}$ (bps) requested by the new non-reserved connection k.

4. The method of determining a route between an origin node and a destination node according to claim 3 wherein the step of assigning a weight comprises the step of determining a Reserved Traffic Weight $w_{R,ij}$ according to the expression:

$$w_{R,ij} = \frac{C_{ij}}{\left(C_{ij} - \hat{C}_{R,ij}\right)}$$

with:

$w_{R,ij}$=1 when no bandwidth is reserved ($\hat{C}_{R,ij}$=0), $$w_{R,ij} = w_{max,R,ij} = \frac{1}{1-rf}$$

when all reservable bandwidth is reserved ($\hat{C}_{R,ij}$=$R_{ij}$);

where:

$C_{ij}$ is the total bandwidth of the link between nodes i and j;

$\hat{C}_{R,ij}$ is the bandwidth reserved on the link between nodes i and j by all the existing reserved connections with a maximum value of $R_{ij}$.

5. The method of determining a route between an origin node and a destination node, according to claim 4, wherein said step of assigning a weight each link as a function of the traffic exceeding the reservable bandwidth comprises the step of determining an Excess Traffic Weight $w_{E,ij}$ according to the equation:

$$w_{E,ij} = \max\left(1, \frac{\hat{C}_{T,ij}^{(2)}}{R_{ij}}\right)$$

where:

$\hat{C}_{T,ij}^{(2)}$ is equal to the bandwidth $\hat{C}_{R,ij}^{(1)}$ reserved on the link by all the existing reserved connections plus the average bit rate $M_{NR,ij}^{(2)}$ used by all the existing non-reserved connections and the new estimated non-reserved connection k:

$$M_{NR,ij}^{(2)} = M_{NR,ij}^{(1)} + m_{NR,k}$$

$R_{ij}$ is the reservable bandwidth of the link.

6. The method of determining a route between an origin node and a destination node, according to claim 5, wherein assigned weight $w'_{ij}$ is the result of the product of:

the Bounded Total Traffic Weight $w_{BT,ij}$, the Excess Traffic Weight $w_{E,ij}$, and the Reserved Traffic Weight $w_{R,ij}$.

7. The method for determining a route between an origin node and a destination node according to claim 6, wherein said step of selecting an optimal path includes the step of minimizing the total weight over the route, or minimizing both hop count and total weight over the route.

* * * * *